(12) United States Patent
Wang

(10) Patent No.: US 8,060,421 B1
(45) Date of Patent: Nov. 15, 2011

(54) OBJECT ORIENTED FINANCIAL ANALYSIS TOOL

(75) Inventor: Paul Po Wang, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 839 days.

(21) Appl. No.: 11/873,698

(22) Filed: Oct. 17, 2007

(51) Int. Cl.
*G06Q 40/00* (2006.01)

(52) U.S. Cl. .......................................... 705/35

(58) Field of Classification Search ............... 705/7, 35; 707/103 Y, 755, 769, 802; 717/104, 110; 715/807
See application file for complete search history.

(56) References Cited

U.S. PATENT DOCUMENTS

| | | | |
|---|---|---|---|
| 6,234,799 B1 * | 5/2001 | Lin ................................. | 434/30 |
| 6,360,188 B1 * | 3/2002 | Freidman et al. ................. | 703/1 |
| 7,512,890 B1 * | 3/2009 | Vogenthaler et al. ......... | 715/744 |
| 7,577,601 B1 * | 8/2009 | Rademacher et al. ...... | 705/36 R |
| 7,873,502 B2 * | 1/2011 | Hicklin et al. .................. | 703/11 |
| 7,974,825 B2 * | 7/2011 | Linebarger et al. ............. | 703/13 |
| 2002/0138390 A1 * | 9/2002 | May ................................ | 705/37 |
| 2003/0055808 A1 * | 3/2003 | Bhat ................................ | 707/1 |
| 2004/0153992 A1 * | 8/2004 | Molina-Moreno et al. ... | 717/105 |

OTHER PUBLICATIONS

Mohamed E. Fayas and Douglas C. Schmidt; Object-Oriented Application Frameworks; Communications of the ACM, vol. 40, No. 10; Oct. 1997; pp. 32-38.*
The MathWorks Financial Toolbox description and assorted web pages associated with the Financial Toolbox, www.mathworks.com, Print Date: Sep. 7, 2007, 12 pages.

* cited by examiner

*Primary Examiner* — Ella Colbert
(74) *Attorney, Agent, or Firm* — Harrity & Harrity, LLP

(57) ABSTRACT

A financial analysis program includes an object oriented architecture having a number of abstract classes associated with performing financial calculations. The abstract classes include an instruments class that defines a number of financial instruments in a hierarchical manner. The abstract classes also include a models class that defines a number of objects or functions used to perform financial calculations. The program also includes an interface to allow a user to pass instrument parameters to the objects or functions and execute the object or function using the instrument parameters.

7 Claims, 11 Drawing Sheets

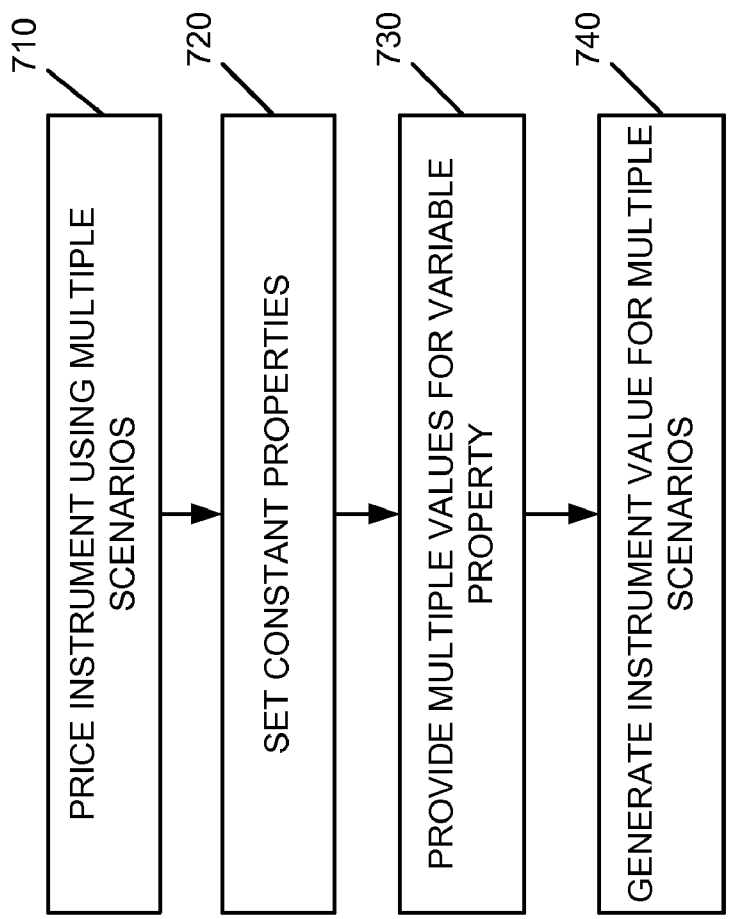

OBJECT ORIENTED FINANCIAL ANALYSIS TOOL

BACKGROUND INFORMATION

Financial data is often analyzed to gain information of interest. For example, assets in a portfolio are often analyzed to minimize risk in the portfolio and optimize return. As another example, pricing a bond may involve complex data analysis that takes into consideration a number of factors (e.g., yield, maturity date, risk, etc.) associated with the bond. Financial analysis programs are often used to perform these tasks. However, such financial programs are often inefficient and suffer from interoperability issues between various tools or functions.

For example, considerable data input is often required in order for a user to perform a particular function that may be repeated many times. Such data input is typically time consuming and inefficient. In addition, each particular function may have a different input mechanism associated with performing the desired calculation. This may make it difficult for the user to interact with the program to perform multiple calculations. Still further, different tools or functions within a program often perform similar processing with respect to analyzing financial data. However, due to interoperability issues, one tool or function cannot typically use a structure or function associated with another tool/function.

BRIEF DESCRIPTION OF THE DRAWINGS

The accompanying drawings, which are incorporated in and constitute a part of this specification, illustrate one or more embodiments and, together with the description, explain these embodiments. In the drawings.

FIG. 7 is a flow diagram illustrating exemplary processing associated with performing a function using the financial modeling and analysis programs of FIG. 3.

DETAILED DESCRIPTION

The following detailed description of exemplary embodiments refers to the accompanying drawings. The same reference numbers in different drawings may identify the same or similar elements. Also, the following detailed description does not limit the invention.

Overview

Systems and methods described herein provide a number of financial tools or programs organized in a hierarchical object oriented system. The object oriented system includes an extensible architecture that allows the financial tools to be flexible. The object oriented system also enhances usability and interoperability between various tools.

Figure 1:
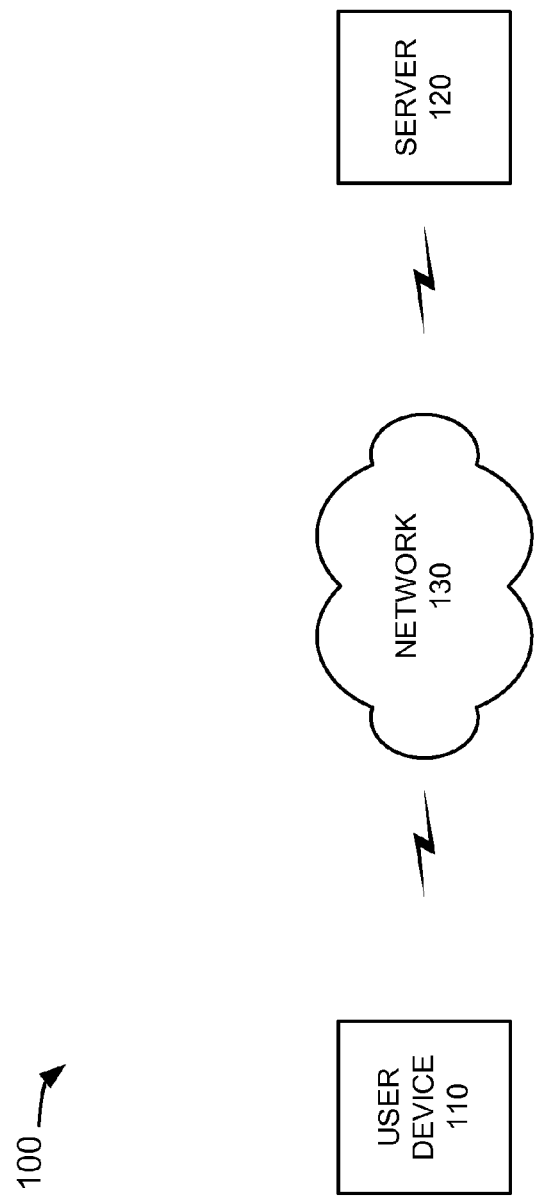
FIG. 1 is a diagram illustrating an exemplary system in which techniques and systems described herein may be implemented.

FIG. 1 is an exemplary diagram of a system 100 in which techniques, systems and computer-readable mediums described herein may be implemented. Referring to FIG. 1, system 100 may include user device 110 and server 120 connected via network 130. One user device 110 and one server 120 have been illustrated in FIG. 1 as connected to network 130 for simplicity. In practice, system 100 may contain fewer, different, and/or additional components than depicted in FIG. 1. Also, in some instances, a user device may perform one or more functions described herein as being performed by a server and a server may perform one or more functions described herein as being performed by a user device.

User device 110 may include a computer device, such as a desktop computer, a personal computer, a laptop computer, a client, a server, a mainframe, a personal digital assistant (PDA), a web-enabled cellular telephone, a smart phone, or another computation or communication device that executes instructions to perform one or more activities and/or functions, as described below.

Server 120 may include one or more server entities that provide access to various financial analysis programs. For example, in one implementation, server 120 may be configured to store and/or provide access to one or more financial application programs or tools. In an exemplary implementation, the financial application programs associated with server 120 may be written using an object oriented architecture that provides for extensibility of various functions, as well as interoperability between programs, as described in detail below. The financial application programs may also be written using standardized or uniform input mechanisms to allow for simplified use by an inexperienced user.

Network 130 may include a local area network (LAN), a wide area network (WAN), a metropolitan area network (MAN), a telephone network, such as the Public Switched Telephone Network (PSTN) or a cellular telephone network, an intranet, the Internet, a wireless network, an optical network, a combination of networks, etc. Network 130 may be a hardwired network using wired conductors and/or optical fibers and/or may be a wireless network using free-space optical, radio frequency (RF), and/or acoustic transmission paths. In one implementation, network 130 may be a substantially open public network, such as the Internet. In another implementation, network 130 may be a more restricted network, such as a corporate virtual network. Implementations of networks and/or devices operating on networks described herein are not limited to any particular data type, protocol, architecture/configuration, etc. In one implementation, user device 110 and server 120 may connect to network 130 via wired and/or wireless connections.

In one implementation, user device 110 may store a number of applications associated with performing financial calculations. In another implementation, user device 110 may access a number of financial applications maintained on server 120 via network 130. If the financial applications are stored in user device 110, server 120 and network 130 may be omitted and user device 110 may function as a standalone device when performing financial calculations.

As described above, user device 110 may store financial modeling and analysis programs that provide the user with the ability to perform any number of financial analysis programs/functions. In some implementations, the financial modeling and analysis programs may be accessible to various user devices, such as user device 110, remotely, such as via network 130.

In either case, user device 110 and/or server 120 may provide or support a technical computing environment (TCE) for performing financial analysis and modeling. A "technical computing environment," as the term is used herein is to be broadly interpreted to include hardware and/or software based logic that provides a computing environment or platform that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, a TCE may be single device. In other implementations, a TCE may include a number of distributed processing devices that each perform a portion of the processing for the TCE.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for financial analysis and modeling, signal processing, image processing, data plotting, parallel processing, etc.). In another implementation, the TCE may provide these functions as block sets. In still another implementation, the TCE may provide these functions in another way, such as via a library, etc. The TCE may also be implemented as a text based environment, a graphically based environment, or another type of environment, such as a hybrid environment that is both text and graphically based.

In other embodiments, the TCE may be implemented using one or more text-based products. For example, a text-based TCE may be implemented using products such as, but not limited to, MATLAB® software by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support parallel processing.

In still other embodiments, the TCE may be implemented using a graphically-based products such as, but not limited to, Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support parallel processing using one or more distributed processing devices.

In still further embodiments, methods and systems described herein may be implemented in a language that is compatible with a product that includes a TCE, such as one or more of the above identified text-based or graphically-based TCEs. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the product may use the MATLAB commands to perform parallel processing.

Still further embodiments may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data).

As described above, systems and techniques described herein may process financial data to obtain information of interest to a user. In some implementations, aspects described herein may be performed via, for example, a web service. For example, the web service may provide user device 110 and/or server 120 with one or more programs provided by a program provider. The term "web service," as used herein, may be a software application that allows machine to machine communication over a network, such as network 130. For example, a server may communicate with a client using an application programming interface (API) that the client accesses over the network. In one embodiment, the server may exchange hypertext markup language (HTML), extensible markup language (XML), or other types of messages with the client using industry compatible standards, such as simple object access protocol (SOAP) and/or proprietary standards. A web service may further include network services that can be described using industry standard specifications, such as web service definition language (WSDL) and/or proprietary specifications.

Exemplary User Device/Server Architecture

Figure 2:
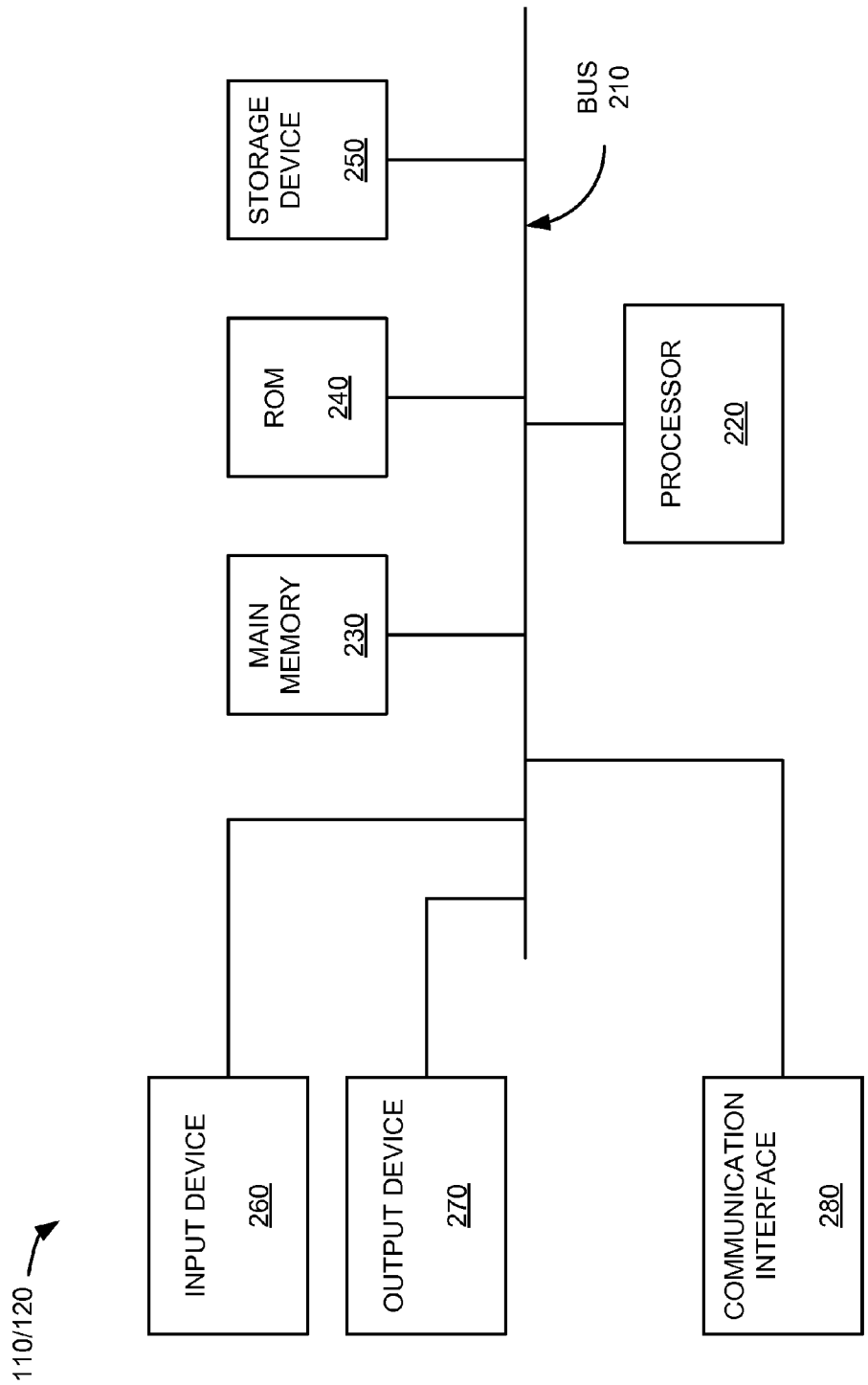
FIG. 2 is an exemplary diagram of the user device and/or server of FIG. 1.

FIG. 2 is an exemplary diagram of user device 110. Server 120 may be configured in a similar manner. Referring to FIG. 1, user device 110/server 120 may include bus 210, processor 220, main memory 230, read only memory (ROM) 240, storage device 250, input device 260, output device 270, and communication interface 280. Bus 210 may include a path that permits communication among the elements of user device 110.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to user device 110/server 120, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables user device 110/server 120 to communicate with other devices and/or systems. For example, communication interface 280 may include mechanisms for communicating with other devices, such as other user devices via a network.

As will be described in detail below, user device 110/server 120, consistent with exemplary embodiments, may perform certain processing-related operations. User device 110/server 120 may perform these operations in response to processor 220 executing software instructions contained in a computer-readable medium, such as memory 230. A computer-readable medium may be defined as a physical or logical memory device. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 2 shows exemplary components of the user device 110/server 120, in other implementations, user device 110/server 120 may contain fewer, different, or additional components than depicted in FIG. 2. In still other implementations, one or more components of user device 110/server 120 may perform the tasks performed by one or more other components of user device 110/server 120.

Figure 3:
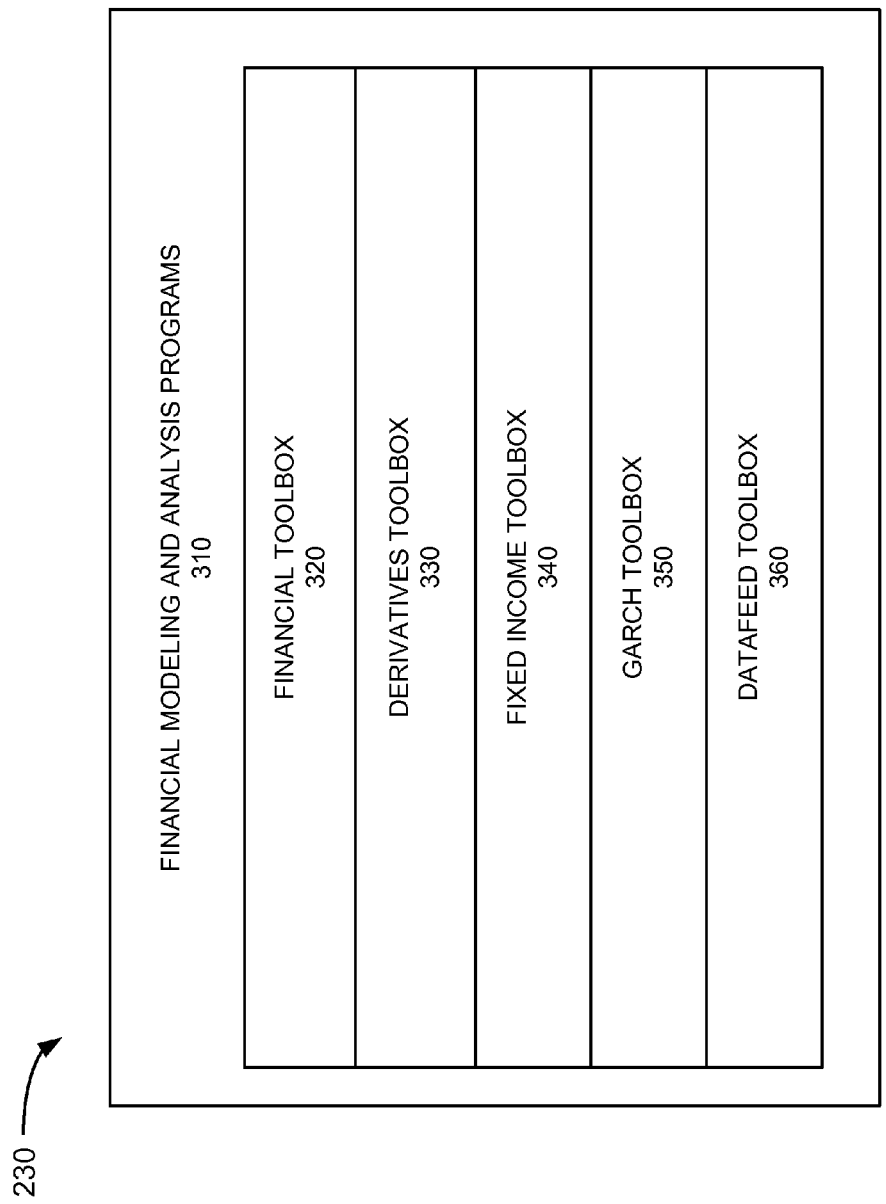
FIG. 3 is a functional block diagram of exemplary components implemented in the user device and/or server of FIG. 2.

FIG. 3 is a functional block diagram of exemplary components implemented in server 120 and/or user device 110 of FIG. 2, such as in memory 230. Referring to FIG. 3, financial modeling and analysis programs 310 may include financial toolbox 320, derivatives toolbox 330, fixed income toolbox 340, generalized autoregressive conditional heteroscedasticity (GARCH) toolbox 350 and datafeed toolbox 360. Each of toolboxes 310, 320, 330, 340, 350, and 360 may include one or more programs that provide for analyzing various financial data, as described in detail below. The term "toolbox," as used herein should also be construed to represent software modules, software functions, or any processing functionality which may be used to process data and generate results for a user. A brief description of programs available in each of these tool boxes is provided below. It should be understood that these programs are exemplary only and additional and/or different programs may be provided in these toolboxes in alternative implementation. It should also be understood that although toolboxes 320, 330, 340, 350, and 360 are shown as distinct entities, in some implementations one or more of toolboxes 320, 330, 340, 350, or 360 may be combined. For example, in one implementation, all of the functions associated with toolboxes 320, 330, 340, 350, and 360 may be included in a single toolbox or program.

Financial toolbox 320 may include a number of functions and/or programs used to, for example, optimize portfolios, estimate risk, analyze interest rate levels, price equity derivatives and handle financial time series data. Derivatives toolbox 320 may include a number of functions and/or programs used to, for example, analyze and model equity and fixed-income derivatives and securities contingent on interest rates. Fixed income toolbox 340 may include a number of functions and/or programs used to, for example, provide fixed income modeling and analysis. For example, the fixed income toolbox 340 may include programs and/or functions for determining the price, yield and cash flow for many types of fixed income securities, such as mortgage-backed securities, corporate bonds, treasury bonds, municipal bonds, certificates of deposits and treasury bills. GARCH toolbox 350 may include a number of functions and/or programs specific to volatility modeling that includes, for example, Monte Carlo simulation of univariate returns, minimum mean square error forecasts, and pre and post-estimation diagnostic and hypothesis testing. Datafeed toolbox 360 may include a number of functions and/or programs that provide access to live market data, time series data and historical market data for use in complex financial and analytical models. For example, datafeed toolbox 360 may retrieve data, such as live data feeds, RSS feeds (e.g., rich site summary feeds, really simple syndication feeds, resource description framework site summary feeds), financial data feeds (e.g., from Bloomberg, Reuters, etc.) and/or retrieve other data (live or historical) from other sources or databases. The data retrieved by datafeed toolbox 360 may be operated on by various algorithms, functions or models within financial modeling and analysis programs 310. Each of the functions and/or programs included in financial modeling and analysis programs 310 may be implemented using an object oriented architecture that is both robust and extensible, as described in detail below.

Figure 4:
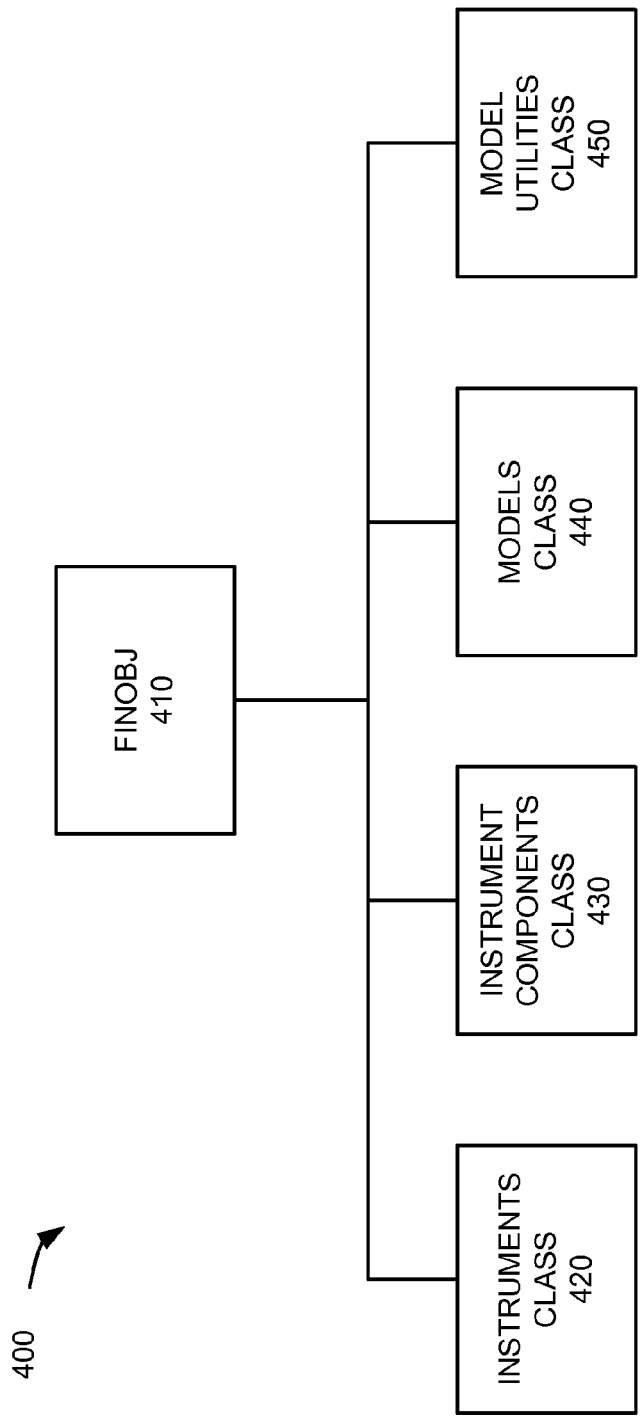
FIG. 4 is a schematic diagram illustrating a portion of the architecture associated with the financial modeling and analysis programs of FIG. 3.

FIG. 4 illustrates a high level diagram depicting the object oriented architecture of financial modeling and analysis programs 310. Referring to FIG. 4, the object oriented architecture 400 includes a common abstract class for each of the programs, labeled FINOBJ 410. Using a common abstract class (i.e., FINOBJ 410) enables architecture 400 to use a single object that controls how each function will perform its particular processing and to display results of the processing, as opposed to having each object include such functionality.

From FINOBJ 410, a number of abstract classes may be defined. In an exemplary implementation, instruments class 420, instrument components class 430, models class 440 and model utilities class 450 may function as classes that define various characteristics for elements used by financial modeling and analysis programs 310.

Instruments class 420 may represent various types of financial instruments (bonds, options, stocks, etc.). Instrument components class 430 may include objects, data and/or other structures used to extend functionality associated with any of the instruments in instruments class 420. Models class 440 may represent various algorithms, functions or structures used to perform financial analysis. Model utilities class 450 includes objects, data and/or other structures that may be used by models in models class 440 to perform various financial calculations.

The base classes 420, 430, 440, and 450 illustrated in FIG. 4 act as building blocks for more complex instruments/functionality. For example, each of classes 420, 430, 440, and 450 shown in FIG. 4 may be broken down into individual instruments or objects having particular properties. In each case, the individual instruments or objects of architecture 400 allow for interoperability between functions performed by various ones of toolboxes 320, 330, 340, 350, or 360 in FIG. 3.

Object oriented architecture 400 may be executed using a distributed and/or parallel computing environment, such as in a TCE described above, or in any other distributed computing environment in which a number of distributed processing devices may each perform a portion of the processing in parallel or series with processing performed by other ones of the processing devices.

Exemplary Processing

Figure 5:
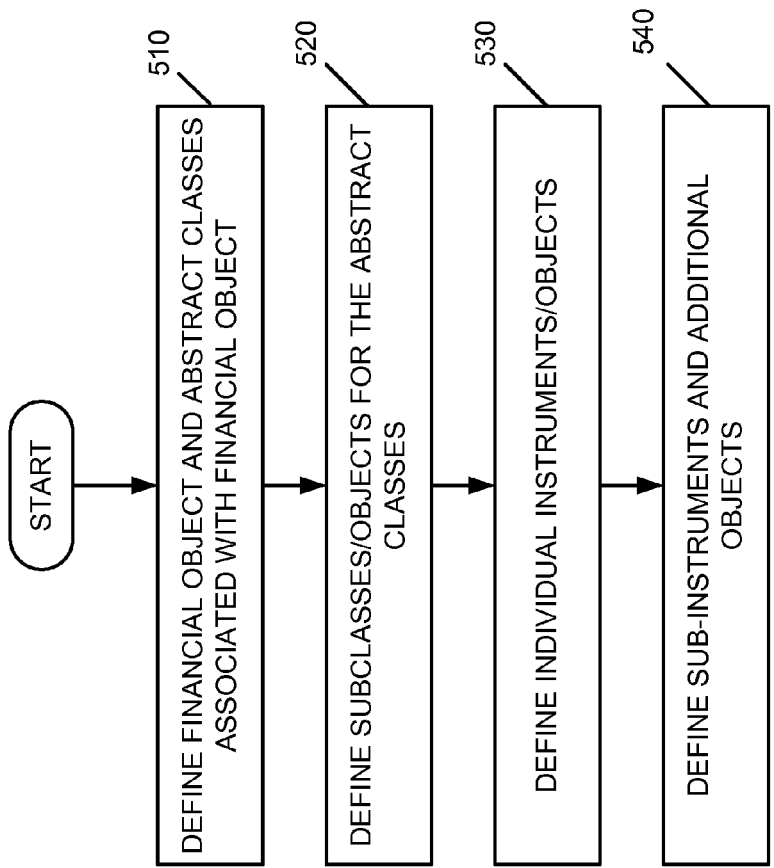
FIG. 5 is a flow diagram illustrating exemplary processing associated with the architecture of FIG. 4.

FIG. 5 is a flowchart of exemplary processing associated with generating financial modeling and analysis programs 310 consistent with architecture 400. Some or all of the processing described below may be performed by a program developer associated with generating financial modeling and analysis programs 310 that may be stored on server 120 for access by various user devices (e.g., user device 110) via network 130 (FIG. 1) or sold by an entity associated with server 120 to various users, such as a user represented by user device 110. Alternatively, the processing may be performed by any program developer associated with an entity that provides financial modeling and analysis programs 310.

Processing may begin by defining a single financial object (i.e., FINOBJ 410) and a number of abstract classes (e.g., classes 420, 430, 440, and 450) associated with FINOBJ 410 (act 510). For example, as described above, FINOBJ 410 may be the high level abstract object associated with performing all or most of the functions in financial modeling and analysis programs 310 (e.g., various programs in one or more of toolboxes 320, 330, 340, 350, or 360). Based on the desired functionality associated with toolboxes 320, 330, 340, 350, or 360, the program developer may identify base classes that will function as the building blocks for more complex instruments and functions associated with performing analysis associated with financial data.

In this example, assume that instruments class 420, instrument components class 430, models class 440 and model utilities class 450, as illustrated in FIG. 4, are defined as the base classes from which more complex elements will be generated/defined. It should be understood that these classes are exemplary only and other classes and/or additional classes may be defined based on the particular functionality associated with financial modeling and analysis program 310.

Figure 6A:
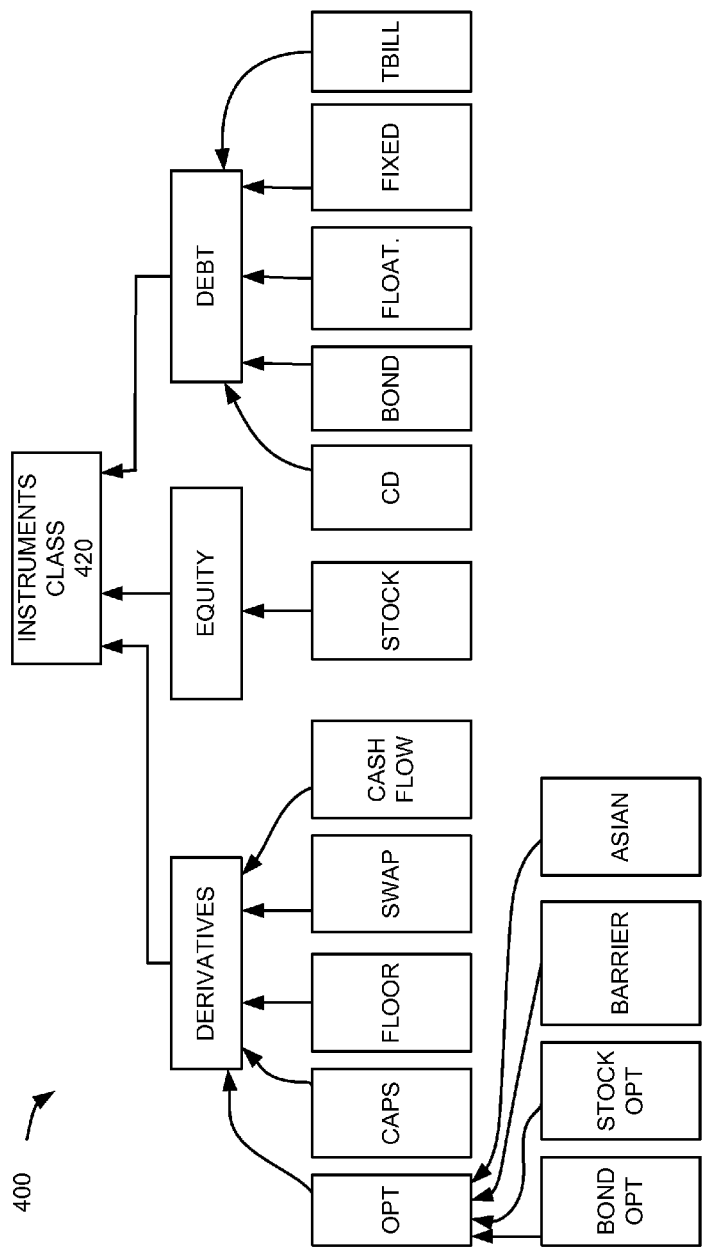
FIGS. 6A-6D illustrate portions of the architecture of FIG. 4 in more detail.

After the classes have been defined, each of the classes (i.e., classes 420, 430, 440, and 450) may be broken down into relevant subclasses, objects or elements (act 520). For example, instruments class 420 may be broken down into a number of abstract classes that define various instruments upon which financial modeling and analysis programs 310 perform data analysis. In an exemplary implementation, instruments class 420 may be broken down into three abstract classes: derivatives, equity and debt. FIG. 6A schematically illustrates the derivatives, equity and debt classes derived from instruments class 420. These three classes provide a classification mechanism that can be used to distinguish one type of instrument from another type of instrument. Similar to the discussion above with respect to classes 420, 430, 440, and 450, these three abstract classes (i.e., derivatives, equity and debt) are exemplary only and other classes and/or additional abstract classes may be defined based on the particular functionality associated with the financial modeling and analysis programs 310. The derivatives, equity and debt instrument classes will be described briefly below.

A debt instrument is an investment in which an investor loans money to an entity for a predetermined period of time in exchange for earning a specified rate of interest on the investment. Equity refers to ownership. Stocks (common or preferred) are often referred to as a type of equity. Therefore, equity instruments entitle the holder of the instrument to some type of ownership. A derivative is a financial instrument whose characteristics and value depends on, or derives from, the characteristics and value of an underlier. An underlier, as described in detail below, is an instrument or variable upon which the value of a derivative depends. In an exemplary implementation, no distinction is made between a debt-derivative and an equity-derivative. That is, if an instrument complies with the definition of a derivative, it will be classified as such. In another implementation, distinctions may be made between types of derivatives and/or financial instruments. For example, a distinction can be made between a debt derivative and an equity derivative.

In some implementations, a hybrid class (not shown in FIG. 6A) may be defined for instruments that have varying combinations of the above categories. In other implementations, specific instruments having a hybrid nature may be defined as belonging to one of the other three classes (i.e., debt, derivatives, or equity).

Returning to FIG. 5, after the instrument classes are defined, the instrument classes may be further broken down into individual instruments for each of the abstract classes (act 530). In an exemplary implementation, the debt class may be broken down to include the following: bond, certificate of deposit (cd), fixed, floater, mortgage backed security (mbs), step coupon and treasury bill (tbill). These instruments each represent a type of debt instrument. The derivatives class may be broken down to include the following: caps, cash flow, floors, future, option and swap. The equity class may be broken down to include common stock. A number of the individual instruments for each of the derivatives, equity and debt classes are illustrated in FIG. 6A. It should be understood that additional instruments for each of these classes may also be provided based on the particular functions associated with financial modeling and analysis programs 310.

Once the individual instrument classes are created, properties that are specific to a specific type of financial instrument (e.g. stock, bond, option, etc) may be assigned to the individual instruments. In other words, various properties make up a specification for a particular instrument. In an exemplary implementation, an instrument may contain a number of types of properties (e.g., five or more). A first property associated with an instrument may be a class identifier property. The class identifier may be used to distinguish one instrument from another instrument in architecture 400. Therefore, each class identifier may include a unique identifier and a description. For example, the class identifier property may include a Committee on Uniform Security Identification Procedures (CUSIP) 9-digit alphanumeric security identifier for each instrument. The description associated with the identifier may be used to further identify what the specific class represents.

A second property associated with an instrument is an underlier. An underlier, also referred to as an underlying instrument, is an instrument or variable upon which the value of a derivative instrument depends. That is, an underlying instrument property name may indicate the type of instrument upon which the derivative depends. For example, a bond may be the underlying instrument upon which an option on a bond depends. It should be noted that not all derivative instruments may be composed of physical underliers. For example, an interest rate cap (caps instrument) may be characterized as a portfolio of call options on zero-coupon bonds. Therefore, similar to an option on a bond, the underlying instrument of an interest rate cap is a bond. However, instead of containing a property that accepts a bond object, the caps class contains properties that may also be found in a bond class.

A third property associated with an instrument is a specification property. Specification properties may be properties other than identifiers, underliers, instrument components (described below), and application data (described below) that specify the characteristics of an instrument.

A fourth property associated with an instrument is a date format property. The data format property allows the user to specify the particular date format to be used when entering and displaying dates. For example, in Europe, a user may prefer to display dates in a day-month-year format. The format in this case would be dd-mm-yyyy, where dd represents the day, mm represents the month and yyyy represents the year. In the United States, however, a user may prefer to display dates in a month-day-year format. The format in this case would be mm-dd-yyyy. Allowing the user to specify the particular format for date information enables a user to more easily enter date information for performing financial calculations and simplifies the user's ability to execute various complex financial calculations using different tools within financial modeling and analysis programs 310.

A fifth property associated with an instrument is an applications data property. The applications data property may be a storage mechanism for dissimilar kinds of data. This property may allow a user to store data that is relevant to an instrument, or specific to an application, that the instrument class may need, but was not originally designed to handle. It should be noted that not all objects may contain an applications data property. For example, models class 440 and model utilities class 450 may not possess this property.

A sixth property associated with an instrument is an instrument component. An instrument component enhances an instrument by adding different functionality components to a simpler class, such as instrument classes. In some implementations, the instruments components property may be defined as an abstract class, as illustrated by instrument components class 430 (FIG. 4).

As described above, various properties make up a specification for a particular instrument. Exemplary syntax associated with a caps instrument is shown below.
Identifier:
Description:
Market:
Strike:
Settle:
Maturity:
Reset:
Basis:
Face:
DateFormat
AppData:
As shown above, the caps instrument includes a class identifier (i.e., identifier and description field), along with specification properties (i.e., market, strike, settle, maturity, reset, basis and face fields), a date format property, and an application data property (i.e., AppData). These fields may be used to define the particular caps instrument. The date format property, as described above, allows the user to specify the particular date format to be used when entering and displaying dates.

After the individual instruments have been defined, one or more of the instruments may be further broken down into sub-instruments (act 540). For example, the option instrument under the derivatives class may include the following exemplary sub-instruments: asian, barrier, bond option, compound, lookback, stock option, swap option. A number of these sub-instruments are illustrated in FIG. 6A under the option instrument. These sub-instruments may have additional properties associated with performing various financial calculations. The details of these properties are not described in detail herein to not unduly obscure the thrust of the invention. However, additional sub-instruments may be created for other individual instruments based on the particular functions that may be performed by various ones of toolboxes 320, 330, 340, 350, or 360.

In order to provide allowances for various functionality and future enhancements to architecture 400, such as the addition of new functions, the elements/objects illustrated in FIG. 6A (and other elements/objects described in FIGS. 6B-6D below) may be designed to take advantage of not only inheritance, but also object composition. Object composition refers to the creation of new or more complex functionality by assembling objects. Instrument objects, such as those illustrated in FIG. 6A, function as the backbone of architecture 400. However, instrument objects alone may not provide adequate functionality to meet the demands associated with modeling and analysis in various areas in finance. To resolve this issue, instrument components class 430 may be designed to provide an avenue to enhance simple instrument objects to meet the needs of different users.

For example, two types of analyses typically exist in finance: ex-ante and ex-post. Ex-ante analysis refers to analysis performed beforehand and ex-post analysis refers to analysis performed after the fact (e.g., retrospective analysis after some event/date). One example of ex-ante analysis would be valuing a stock and then comparing the predicted results to the stock's actual price. Ex-post analysis looks back and determines what would have been the best course of action given what actually happened. An example of ex-post analysis is value at risk (VaR) analysis, which estimates the probability of portfolio losses based on the statistical analysis of historical price trends and volatilities.

Figure 6B:
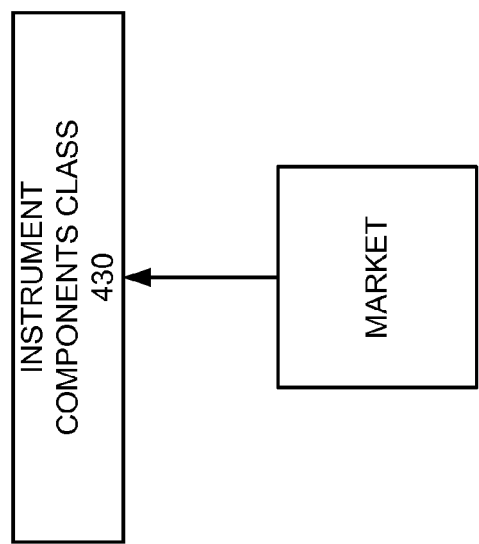

In an exemplary implementation, instruments class 420 and associated methods/functions provide support mainly for ex-ante analysis, although it is possible to perform some limited ex-post analysis due to the properties and nature of their designs. Since ex-post analysis is often performed on market data, such as historical time series information, processing may return to act 520 (FIG. 5) to define instruments components class 430 to include a market class, as illustrated in FIG. 6B. The market class may be defined to support basic time series information and analysis. In an exemplary implementation, the market class may include a price property to handle time series data. As described above, the properties make up a specification for a particular instrument or class. Exemplary syntax associated with a market class is shown below.
Identifier:
Description:
Price:
ValuationDate:
DateFormat:
AppData:
As shown above, the market class includes a class identifier (i.e., identifier and description field), along with price field, valuation date field, date format field and applications data field. The time component associated with the data stored in the price field may be stored in the valuation date field. In some implementations, the market object itself may not inherently support time series data manipulations, such as those found in various financial time series tools. However, in other implementations, the market class may include methods/functions that can be used to perform financial time series manipulations.

Figure 6C:
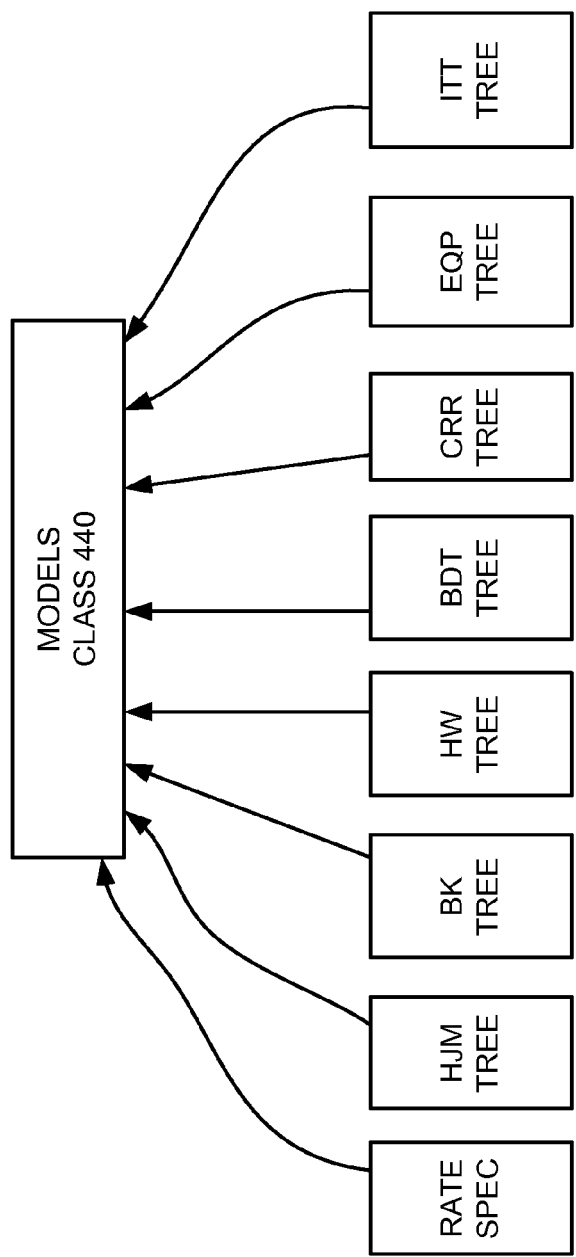

Referring back to FIG. 5 at act 520, models class 440 may be broken down to include a number of objects associated with the modeling functions to be performed by various programs/functions in toolboxes 320, 330, 340, 350, or 360. For example, models class 440 may be broken down to include a number of objects used to create a number of financial trees, such as a Black-Derman-Toy (BDT) forward rate tree object, a Black Karasinski (BK) forward rate tree object, a Cox-Ross-Rubinstein (CRR) price tree object, an equal probability (EQP) price tree object, a Heath-Jarrow-Morton (HJM) cash flow tree object, a Hull-White (HW) cash flow tree object and an implied trinomial (ITT) price tree object. Models class 440 may also be defined to include an interest term (ratespec) structure object. These objects are illustrated in FIG. 6C and may be used to perform various financial functions across a number of the various toolboxes 320, 330, 340, 350, or 360, as described in more detail below.

Figure 6D:
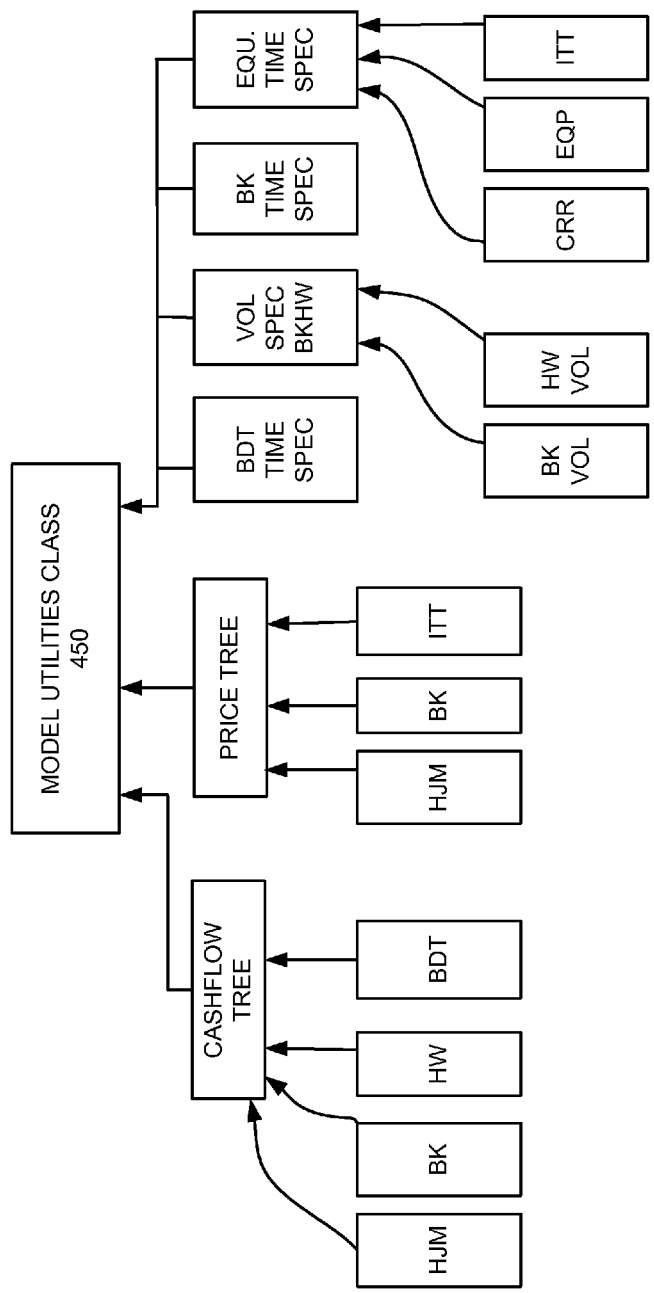

Models utilities class 450 may also be broken down to include a number of objects associated with the models defined under the models class 440 (act 520). For example, model utilities class 450 may be broken down to include the following objects: a time object for a BDT tree (BDT-timespec), a BDT interest rate volatility process object (bdtvolspec), a time object for a BK tree (bktimespec), a cash flow tree object (cashflowtree), a time object for an EQP tree (eqptimespec), a time object for an HJM tree (hjmtimespec), an HJM forward rate volatility process object (hjmvolspec), a time object for an HW tree (hwtimespec), a price tree object (pricetree) and a BK or HW interest rate volatility process object (volspecbkhw). A number of these objects are illustrated in FIG. 6D. In an exemplary implementation, some of the individual objects in the model utilities class 450 may be further defined.

For example, the cash flow tree object may be subdivided into a BDT cash flow tree object, a BK cash flow tree object, an HJM cash flow tree object and an HW cash flow tree object. Further, the price tree object may be broken down into a BDT price tree object, a BK price tree object, a CRR price tree object, an EQP price tree object, an HJM price tree object, an HW price tree object and an ITT price tree object. The interest rate volatility process object (volspecbkhw) may be broken down into a BK interest rate volatility process object and an HW interest rate volatility process object. Still further, the time object for an EQP tree (equitytimespec) may be broken down into a time object for a CRR tree (crtimespec), a time object for an EQP tree (eqptimespec) and a time object for an ITT tree (itttimespec). A number of these objects are illustrated in FIG. 6D. These objects may be used to aid in performing perform various financial calculations, as described in detail below.

The various classes (i.e., classes 420, 430, 440, and 450) illustrated in FIG. 4 and their sub-classes/objects illustrated in FIGS. 6A-6D provide a framework for performing various analysis techniques regarding financial data. For example, once an instrument object is specified or instantiated, valuation of that instrument is possible. Valuation is accomplished via the methodologies associated with each instrument class, which may require additional parameters besides those in the instrument specifications. In an exemplary implementation, methods for performing various financial calculations in object oriented architecture 400 may be invoked via the syntax, instrument.method_name( ). The particular methods may be derived from the functions that are to be provided in the various toolboxes (e.g., toolboxes 320, 330, 340, 350, or 360). Since valuation of an instrument often constitutes calculating a price or price sensitivities, these operations will be common methods for all the instrument classes. In other words, various methods, functions and objects in object oriented architecture 400 may be used across all of toolboxes 320, 330, 340, 350, and 360, resulting in efficient processing associated with financial modeling and analysis programs 310. In addition to common methods, each instrument may have other specific methods for calculating yields, zero rates, etc. Again, the available methods for each instrument class will be determined by the desired functionality associated with the various toolboxes (e.g., toolboxes 320, 330, 340, 350, or 360) for that instrument type.

An exemplary object (i.e., a bond option object) is illustrated below.
Identifier:
Description:
Bond: [1×1 bond]
Market:
Strike: 96
Settle: 730486 (1 Jan. 2000)
ExerciseDates: 731582 (1 Jan. 2003)
OptionSpec: call
AmericanOption: 0
DateFormat:
AppData:
Exemplary syntax for a method used to call the bond option object is shown below.
    bondoption display price sensitivity
In this embodiment, the bond option object includes a class identifier property (e.g., identifier and description), along with various specification data defining the bond, strike information, settle information, exercise dates and option specification information. Valuation for the bond option class may be invoked using either of the following:
outputs=method_name(mfcs, extra_parameters, . . . ), or
outputs=mfcs.method_name(extra_parameters, . . . )
The first syntax may be compatible with an existing financial analysis program (e.g., financial tools available from The MathWorks, Inc.) and the second syntax may be associated with object oriented architecture 400 that may be compatible with existing tools, as well as new financial analysis tools available in financial modeling and analysis programs 310. In other words, object oriented architecture 400 may be compatible with existing financial tools in some implementations, while also being useful for providing an architecture for new programs and functionality.

Models class 440, as described above, may be used to further enhance valuation methods by providing specialized functionality that may be instantiated and passed directly to a valuation method along in the argument list. For instance, one can value a bond by common price/yield formulas, but alternative pricing methods can be based on different models such as a HJM interest rate tree. Exemplary syntax for an HJM tree object is shown below.
Identifier:
Description:
VolSpec: [1×1 hjmvolspec]
TimeSpec: [1×1 hjmtimespec]
RateSpec: [1×1 ratespec]
DateFormat:
TreeTimes: [1×5 double]
TreeDates: [1×5 double]
FwdTimes: [1×5 cell]
CFTimes: [1×5 cell]
FwdTree: [1×5 cell]
RateTree: [1×5 cell]
    In an exemplary implementation, models are passed as the first argument to methods, such as via the following syntax: p=ob.Bond.price (hjm). Models may also be represented by any data type in MATLAB® software (e.g., vectors, function handles, etc).

Model utilities class 450, as described above, may be used to enhance models class 440 in a manner similar to instrument components class 430 enhancing instruments class 420. For example, model utilities class 450 may leverage object composition techniques to enhance various models. Further, combining various model utilities provides further specialization of valuation methods.

Object oriented architecture 400 (FIG. 4) may also define portfolios and a universe to aid in performing various financial functions. A portfolio may be a collection or group of assets. Two fundamental properties of a portfolio may be the asset and the quantity of the asset. The quantity of each asset can be expressed as an amount of each asset (holdings) or as a percentage of the total amount of all the assets (weights). These two aspects of a portfolio make up a basic portfolio class. Exemplary syntax of a portfolio class is shown below.
Identifier:
Description:
Assets:
Quantity:
QuantityType: 'Weights'
As illustrated, the portfolio class includes a class identifier (e.g., identifier and description), an assets field, a quantity field and a quantity type field. The asset property is designed to handle a heterogeneous group of assets which includes not only instrument objects, but also other portfolio objects. In other implementations, the holdings may be stored with the asset itself (e.g., by using a holdings property in the instrument classes). The quantity property may store the number of holdings of each asset or the weights (percentages) of each asset. In order to specify the type of the quantity, the QuantityType property must be set either to 'Weights' or 'Holdings'.

Valuation of a portfolio may be accomplished via the methods/functions of the portfolio class. Standard operations, such as pricing of the portfolio and calculation of the sensitivities, generation of efficient frontiers, and portfolio allocation routines may be used to perform these functions.

The ability to extract specific instruments from a portfolio can be accomplished via a universe class object. An analogous example of a universe object is a structured query language (SQL) statement that specifies the criteria for extracting specific elements from a database. A universe object, like the SQL statement, specifies the criteria for extracting specific instruments (elements) from a portfolio (database). For example, a universe object may operate in conjunction with a portfolio object and extract from the portfolio all instruments of the class bond and option, with settlement dates after, for example, Jan. 1, 2007, and which are call options.

Set operations (union, intersection, etc) may also be performed on different universe objects to create a subset of criteria for portfolio instrument extraction. For example, universe object A may specify the extraction of all bonds and options and universe object B may specify the extraction of any instrument with a settlement date after Jan. 1, 2007 and any instrument that is a call option. The union of universe objects A and B results in a single universe object whose criteria for extraction from a portfolio object instruments of the class bond and option, with settlement dates after Jan. 1, 2007, and which are call options.

As discussed above, object oriented architecture 400 may include other functionality based on the particular requirements associated with financial modeling and analysis programs 310. For example, in some implementations, a blotter object may be implemented in object oriented architecture 400. A blotter object may store a record of trades and the details of the trades made over a period of time (usually one trading day). The details of a trade will include such things as the time, price, order size and a specification of whether it was a buy or sell order. The blotter object may be created through a trading software program that records the trades made through a data feed that may be part of datafeed toolbox 360. The main purpose of a trade blotter is to carefully document the trades so that they can be reviewed and confirmed by the trader or the brokerage firm. The blotter is used in the stock market, foreign exchange market, and the bond market and can be customized based on the needs of the user.

As described above, object oriented architecture 400 provides a robust design for a number of extensible tools that can provide for analyzing a large number of financial products. In addition, the object oriented architecture 400 may allow users to develop their own instruments, models and analysis algorithms using the basic building blocks discussed above. In other words, object oriented architecture 400 provides a platform for any number of existing tools and future tools associated with performing financial analysis.

FIG. 7 illustrates exemplary processing associated with using financial modeling and analysis programs 310. Assume that a user has financial modeling and analysis programs 310 stored on user device 110. Further assume that a user wishes to price a financial instrument, such as a bond based on multiple scenarios (act 710). For example, suppose a user wishes to price a bond having three different coupon rates. The user may select an option for pricing a bond via a graphical user interface (GUI) that is part of financial modeling and analysis programs 310. The GUI may include a number of drop down menus that aid in selecting the desired function. The GUI may be implemented via object oriented architecture 400. As described above, object oriented architecture 400 may be implemented via a TCE or via any other platform, system or device. In other implementations, a GUI may not be needed. For example, object oriented architecture 400 may allow a user to enter command line syntactical inputs to perform various financial calculations.

The user may then set various properties associated with the bond, such as the settlement date, data of maturity, period, basis, face value, etc., to the desired constant values (act 720). These properties may also be set via one or more GUIs that facilitate entry of this information. In alternative implementations, the user may enter the desired information via command line syntactical inputs. The user may then set the variable property (i.e., coupon rate in this example) to three different values (act 730). The particular toolbox (e.g., one of toolboxes 320, 330, 340, 350, or 360) may then execute the desired function (i.e., calculate the bond price) based on the three different coupon rates (act 740).

Exemplary syntax for performing this operation is illustrated below.
Identifier:
Description:
Market:
CouponRate: [3×1 double]
Settle: 730486 (1 Jan. 2000)
Maturity: 731947 (1 Jan. 2004)
Period: 2
Basis: 0
EndMonthRule: 1
IssueDate:
FirstCouponDate:
LastCouponDate:
Face: 100
StartDate:
DateFormat:
AppData:
The variable property is shown in bold above. The user may provide three different coupon rates, such as 0.0400, 0.0500 and 0.0600, which may then be inserted into the function when running the pricing calculation.

In this manner, the common portion of the function has been defined as an instrument object and the user may simply enter different coupon rates as arguments for the coupon rate. Similarly, object composition (e.g., combining objects into more complex ones) via vectorization may also enable an instrument or model to achieve rapid prototyping advantages. In addition, multiple scenarios may be generated without compromising underlying models.

For example, suppose that the user wishes to calculate an option on three different bonds. In this case, the user may set various properties as constant (i.e., strike price, settlement date, exercise dates, etc.) and provide variable information corresponding to each particular bond of interest. Exemplary syntax for performing this operation is illustrated below.
Identifier:
Description:
Bond: [3×1 bond]
Market:
Strike: 96
Settle: 730486 (1 Jan. 2000)
ExerciseDates: 731582 (1 Jan. 2003)
OptionSpec: call
AmericanOption: 0
DateFormat:
AppData:
The variable property is shown in bold above. The user may then select three different bond objects to be used for this financial bond object calculation. In this manner, object oriented architecture 400 simplifies the running of multiple scenarios by extracting common portions of functions that are to be used and defining these common portions as objects.

Figure 8:
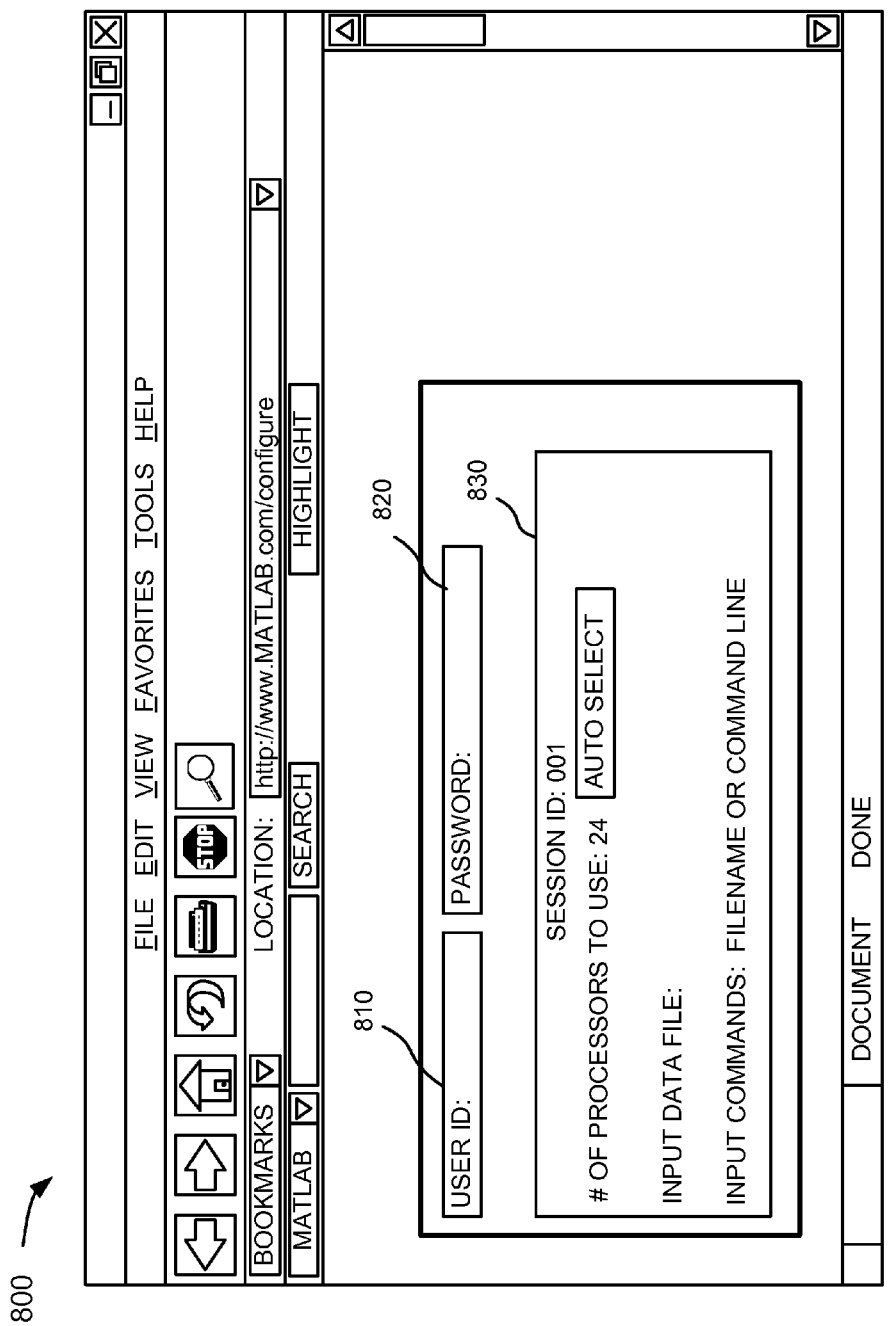
FIG. 8 is a diagram of an exemplary graphical user interface provided to a user by a technical computing environment/platform or another platform.

As described above, a GUI associated with financial modeling and analysis programs 310 may be used to aid a user in performing various financial calculations via user device 110 and/or server 120. Referring to FIG. 8, assume that a user at user device 110 wishes to input data for execution by financial modeling and analysis programs 310, which may be executed by a TCE or any other environment/platform at server 120 (FIG. 1). In this case, server 120 may provide GUI 800, which includes a user identification (ID) area 810 and a password area 820 for allowing the user to enter an ID and/or password. In some implementations GUI 800 may also include an input area 830 that allows a user to specify a number of processors to use when executing financial modeling and analysis programs 310. For example, exemplary implementations may use a number of distributed processing devices (e.g., a grid of parallel processors) to perform the financial processing. Input area 830 may also allow the user to specify an input data file for execution by financial modeling and analysis programs 310. The input data file may identify a location of a number of data sets for which the user wishes to run financial calculations. User input area 830 may also include an area for allowing the user to specify which particular program (e.g., which of toolboxes 320, 330, 340, 350, or 360) that the user wishes to run. It should be understood that a similar GUI may be provided when the user is executing financial modeling and analysis programs 310 locally at user device 110.

Once the user has selected the particular program, GUI 800 may provide a number of drop down menus that facilitate entry of the particular information for execution by the desired program. For example, in an exemplary implementation, the GUI provided by financial modeling and analysis programs 310 may be use a standardized input argument interface for input parameters, values or other information for execution by a particular function. In addition, the GUI may provide a standardized date input interface for allowing the user to enter date information associated with performing various financial calculations for each of the toolboxes 320, 330, 340, 350, and 360. Using such standardized interfaces greatly simplifies use of financial modeling and analysis programs 310.

In addition, financial modeling and analysis programs 310 may provide an interface for inputting, for example, Excel files or other types of financial application files. Such files are commonly used in finance. Therefore, providing an interface for inputting Excel files (or other financial type files) or outputting information to such files enhances the functionality associated with financial modeling and analysis programs 310.

As described above, object oriented architecture 400 may be executed using a distributed and/or parallel computing environment. In some implementations, distributed computing may enhance the performance associated with executing various financial calculations. For example, instrument functions or methods may distribute the financial calculation workload to various clients/processing devices to perform certain tasks and then aggregate the results to produce a final result.

CONCLUSION

Systems and techniques described herein provide for processing financial data to obtain information of interest. Using an object oriented architecture allows for increased flexibility, interoperability between programs and ease of use.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while exemplary classes, instruments, objects and functions have been described above, in other embodiments, other classes, instruments, objects and functions may be used based on the particular system requirements.

In addition, exemplary syntax has been described above that is compatible with MATLAB®. In other implementations, other syntax, such as Java compatible syntax may be used in object oriented architecture 400.

In some implementations, various portions of object oriented architecture 400 may be encrypted by a compiler used in connection with financial modeling and analysis programs 310. Such encryption may protect the design and/or algorithms used to construct instruments, models, etc.

In addition, in some implementations, various portions of object oriented architecture 400 may be implemented as add-ins or plug-ins to a conventional spreadsheet application, such as Excel. For example, object oriented architecture 400 may be used in connection with MATLAB® Builder for Excel to convert various algorithms associated with object oriented architecture 400 into independent Excel add-ins.

In addition, object oriented architecture 400 may also be used in conjunction with MATLAB® Builder for .NET, which extends the MATLAB® compiler with tools for automatically generating independent .NET assemblies or Common Object Model (COM) objects from models or algorithms associated with or generated by object oriented architecture 400. A .NET assembly may be called from C#, VB.NET, or any other Common Language Specification (CLS)-compliant language. A COM object may be called from any COM-compliant technology, such as Visual Basic, ASP, and Microsoft Excel.

In still other implementations, object oriented architecture 400 may be used in conjunction with MATLAB® Builder for Java™, which allows a user to integrate MATLAB® applications or in this case, integrate algorithms or models designed with object oriented architecture 400 into a number of Java programs. In such implementations, a user may create a Java wrapper around the application, algorithms, models, etc., associated with object oriented architecture 400. MATLAB® based Java classes may then be deployed on, for example, desktop machines or Web servers.

In addition, object oriented architecture 400 may be used with a number of simulation engines, such as a Monte Carlo simulation engine implementing stochastic differential equations. Such simulation engines could then be used by algorithms, functions or methods associated with various objects in object oriented architecture 400, e.g., instrument objects, portfolio objects, market objects, etc.

Still further, while series of acts have been described with regard to FIGS. 5 and 7, the order of the acts may be modified in other embodiments. Further, non-dependent acts may be performed in parallel.

It will be apparent that aspects, as described above, may be implemented in many different forms of software, firmware, and hardware in the embodiments illustrated in the figures. The actual software code or specialized control hardware used to implement aspects described herein is not limiting of the invention. Thus, the operation and behavior of the aspects were described without reference to the specific software code—it being understood that one would be able to design software and control hardware to implement the aspects based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computer device, the method comprising:
defining a common abstract class associated with performing a plurality of financial calculations associated with a plurality of programs having a common object oriented architecture, the defining the common abstract class being performed by the computer device;
defining an instrument class within the common abstract class, the instruments class comprising a plurality of equity, debt, or derivatives instruments arranged in a hierarchical manner, the defining the instrument class being performed by the computer device;
defining a models class within the common abstract class, the models class comprising one or more objects or functions used by the plurality of programs to perform the plurality of financial calculations, the defining the models class being performed by the computer device;
providing an input mechanism through which a user can provide one or more parameters to at least one of the one or more objects or functions, the providing being performed by the computer device;
performing a financial calculation based on the one or more parameters provided via the input mechanism, the performing being performed by the computer device; and
outputting a result of the financial calculation, the outputting being performed by the computer device.

2. The method of claim 1, further comprising:
using a same one of the one or more objects or functions in the models class by different ones of the plurality of programs.

3. The method of claim 1, further comprising:
defining an instrument components class that extends functionality of the instrument class, where the instrument components class includes a market class used to store time series information relating to market data.

4. The method of claim 3, further comprising:
defining a model utilities class that extends functionality of the models class, where the model utilities class provides functionality associated with performing financial calculations.

5. The method of claim 1, further comprising:
generating a standardized date input mechanism for inputting date information associated with the financial calculations.

6. The method of claim 1, further comprising:
providing an input mechanism through which the user can enter a plurality of input values for executing the financial calculation multiple times using each of the input values.

7. The method of claim 1, where the plurality of programs execute one or more of MATLAB code, Simulink software, MATLAB-compatible software, or Simulink compatible software.

\* \* \* \* \*

UNITED STATES PATENT AND TRADEMARK OFFICE
CERTIFICATE OF CORRECTION

| | | |
|---|---|---|
| PATENT NO. | : 8,060,421 B1 | Page 1 of 1 |
| APPLICATION NO. | : 11/873698 | |
| DATED | : November 15, 2011 | |
| INVENTOR(S) | : Paul Po Wang | |

It is certified that error appears in the above-identified patent and that said Letters Patent is hereby corrected as shown below:

Column 14, line 53, please amend "CouponRate: [3×1 double]" to read "CouponRate: [3×1 double]".

Signed and Sealed this
Twenty-ninth Day of January, 2013

David J. Kappos
*Director of the United States Patent and Trademark Office*